United States Patent [10] Patent No.: US 8,550,109 B2
Miyata et al. (45) Date of Patent: Oct. 8, 2013

(54) GAS METER DEVICE AND GAS SUPPLY SYSTEM USING THE DEVICE

(75) Inventors: Hajime Miyata, Nara (JP); Youichi Itou, Nara (JP); Kenichi Kamon, Shiga (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 12/747,061

(22) PCT Filed: Dec. 5, 2008

(86) PCT No.: PCT/JP2008/003624
§ 371 (c)(1),
(2), (4) Date: Jun. 9, 2010

(87) PCT Pub. No.: WO2009/075082
PCT Pub. Date: Jun. 18, 2009

(65) Prior Publication Data
US 2010/0269596 A1 Oct. 28, 2010

(30) Foreign Application Priority Data
Dec. 10, 2007 (JP) .................................. 2007-318159

(51) Int. Cl.
*F16L 5/00* (2006.01)
(52) U.S. Cl.
USPC ............. 137/357; 137/485; 137/557; 702/50; 702/189
(58) Field of Classification Search
USPC ......... 137/485, 357, 551, 557; 73/275; 702/1, 702/33, 34, 35, 50, 51, 127, 187, 189
See application file for complete search history.

(56) References Cited

U.S. PATENT DOCUMENTS

| 5,369,598 A | * | 11/1994 | Horiike et al. .................. 702/46 |
| 5,902,933 A | * | 5/1999 | Bingo et al. ..................... 73/724 |
| 6,065,351 A | * | 5/2000 | Nagaoka et al. ........... 73/861.28 |
| 6,076,542 A | * | 6/2000 | Titus ............................... 137/14 |
| 6,246,677 B1 | * | 6/2001 | Nap et al. ...................... 370/346 |

(Continued)

FOREIGN PATENT DOCUMENTS

| JP | 2003-149027 A | 5/2003 |
| JP | 2004-144642 A | 5/2004 |
| JP | 2004-205421 A | 7/2004 |
| JP | 2007-292393 A | 11/2007 |

OTHER PUBLICATIONS

International Search Report for International Application No. PCT/JP2008/003624, dated Feb. 17, 2009, 1 page.

*Primary Examiner* — John K Fristoe, Jr.
*Assistant Examiner* — Jessica Cahill
(74) *Attorney, Agent, or Firm* — Brinks Hofer Gilson & Lione

(57) ABSTRACT

A gas meter device is provided which is configured in a manner that even if a user takes an unauthorized action such as the removal of a gas meter device in order to use gas without authorization, since the generation of a particular flow-rate change profile different from a normal flow-rate change profile of a gas appliance is detected, the sign of the tamper of the gas can be detected, whereby the tamper of the gas can be prevented. The gas meter device includes an appliance determining unit 6 for determining a gas appliance being used and a tamper determining unit 7 which determines that the gas is used without authorization in the case where the particular flow-rate change profile different from an appliance determining value registered in a registration storage unit 5 is generated.

20 Claims, 12 Drawing Sheets

(56) References Cited

U.S. PATENT DOCUMENTS

| | | | |
|---|---|---|---|
| 6,625,549 B1 * | 9/2003 | Nawa et al. | 702/51 |
| 6,691,582 B1 * | 2/2004 | Nawa et al. | 73/861.28 |
| 6,725,878 B1 * | 4/2004 | Nawa et al. | 137/487.5 |
| 6,772,643 B2 * | 8/2004 | Eguchi et al. | 73/861.28 |
| 6,954,814 B1 * | 10/2005 | Leach | 710/305 |
| 2007/0272031 A1 * | 11/2007 | Koba et al. | 73/861.21 |

* cited by examiner

PATTERN TABLE

| T1 | T2 | T3 | T4 | T5 | Q1 | Q2 | Q3 | Q4 | Q5 |
|----|----|----|----|----|----|----|----|----|----|
| 2.5 | 4.5 | 13 | - | - | 43 | 145 | 205 | - | - |

PRIOR ART

GAS METER DEVICE AND GAS SUPPLY SYSTEM USING THE DEVICE

This application is a 371 application of PCT/JP2008/003624 having an international filing date of Dec. 5, 2008, which claims priority to JP2007-318159 filed Dec. 10, 2007, the entire contents of which are incorporated herein by reference.

TECHNICAL FIELD

The present invention relates to a technique of determining and detecting a gas appliance in use in order to provide a fee structure and a service accorded to an appliance to be used and how to use thereof, in a gas meter which is disposed at the inlet portion of a gas supply pipe in each home and measures a gas flow rate.

BACKGROUND ART

Conventionally, as shown in FIG. 13, with respect to such a kind of the flow rate measuring device, there is proposed the following method as a method of determining a particular appliance (see patent document 1, for example).

The operation of the proposed example will be explained. FIG. 13 shows a gas flow-rate change profile at the time of starting a gas appliance and reference values (profile table) for performing a profile matching based on the profile. For each gas appliance, the number of the profile tables to be prepared is required corresponding to the number of a series of the gas flow-rate change profiles. Further, the number of the profile tables is required corresponding to the total number of gas appliances used in respective homes. The change of the flow rate measured by the flow rate measuring device of a gas meter is always compared with the profile tables to thereby extract the matched profile table and specify an appliance being used.

Patent document 1: JP-A-2003-149027

DISCLOSURE OF THE INVENTION

Problems that the Invention is to Solve

In the aforesaid configuration, even if a user takes an unauthorized action such that a gas meter device is removed or a pipe is modified so as to bypass the gas meter device in order to use the gas without authorization, the gas flow-rate change profile of the gas appliance does not change between before and after the unauthorized action. Thus, there arises a problem that the tamper of gas before and after the unauthorized action can not be prevented.

The invention is intended to solve the aforesaid problem and an object of the invention is to provide a technique which can detect, when a user takes an unauthorized action, the generation of a particular flow-rate change profile different from a normal flow-rate change profile of a gas appliance to thereby prevent tamper of gas.

Means for Solving the Problems

In order to solve the aforesaid problem of the related art, the gas meter device according to the invention is configured to include:

a flow-rate measuring unit which is coupled to a gas supply pipe for homes and measures a gas flow rate;

an appliance information input unit;

a registration storage unit which stores data registered by the appliance information input unit;

an appliance determining unit which compares an appliance determining value registered in the registration storage unit with a gas flow-rate value measured by the flow-rate measuring unit to thereby determine a gas appliance being used; and a tamper determining unit which determines that gas is used without authorization when a particular flow-rate change profile different from the appliance determining value registered in the registration storage unit is generated due to an unauthorized action of a user or the like.

Advantages of the Invention

The gas meter device according to the invention is configured to detect, when a user takes an unauthorized action, the generation of a particular flow-rate change profile different from a normal flow-rate change profile of a gas appliance. Thus, since the sign of the tamper of the gas can be detected, the tamper of the gas can be prevented.

Figure 1:
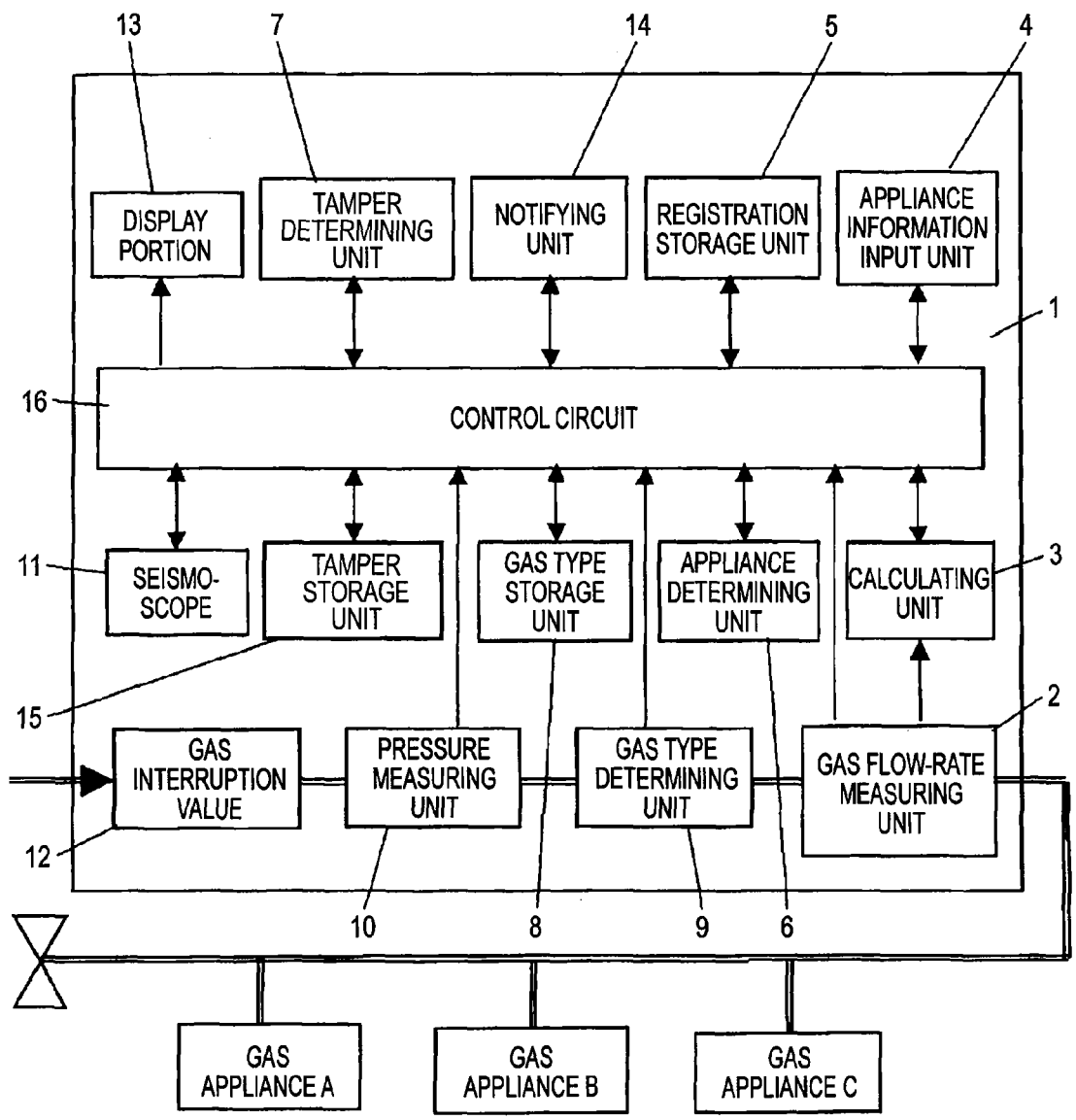
FIG. 1 is a diagram showing the configuration of a flow-rate measuring apparatus according to the first embodiment of the invention.

EXPLANATION OF SYMBOLS 1 gas meter device
2 gas flow-rate measuring unit
3 calculating unit
4 appliance information input unit
5 registration storage unit
6 appliance determining unit
7 tamper determining unit
8 gas type storage unit
9 gas type determining unit
10 pressure measuring unit
11 seismoscope
12 gas interruption valve 13 display portion
14 notifying unit
15 tamper storage unit
16 control circuit
17 measuring flow path
18, 19 ultrasonic transmitter-receiver

BEST MODE FOR CARRYING OUT THE
INVENTION

The first invention is configured to include a flow-rate measuring unit which is coupled to a gas supply pipe for homes and measures a gas flow rate; an appliance information input unit; a registration storage unit which stores data registered by the appliance information input unit; an appliance determining unit which compares an appliance determining value registered in the registration storage unit with a gas flow-rate value measured by the flow-rate measuring unit to thereby determine a gas appliance being used; and a tamper determining unit which determines that gas is used without authorization when a particular flow-rate change profile different from the appliance determining value registered in the registration storage unit is generated due to an unauthorized action of a user or the like. Thus, even if a user takes an unauthorized action such as the removal of a gas meter device in order to use gas without authorization, since the generation of a particular flow-rate change profile different from a normal flow-rate change profile of a gas appliance is detected, the sign of the tamper of the gas can be detected, whereby the tamper of the gas can be prevented.

The second invention is configured, in particular, in the gas meter device according to the first invention, to further include a gas type storage unit which stores gas type supplied into the gas supply pipe at a time of normal use; and a gas type determining unit which determines gas type being supplied at present, wherein the tamper determining unit determines that the gas is used without authorization in a case where, in addition to that the particular flow-rate change profile different from the appliance determining value registered in the registration storage unit is generated, the gas type determined by the gas type determining unit differs from the gas type stored in the gas type storage unit due to mixture of air or the like. and so the gas type changes. According to this configuration, when the particular flow-rate change profile considered to be caused by the tamper of a user is generated, the gas type is determined to thereby confirm whether or not the component of the gas has changed. Thus, since it is possible to totally determine whether or not the flow-rate change profile is generated due to the tamper of a user or occurs accidentally due to another reason, the tamper of the gas can be prevented more surely.

The third invention is configured, in particular, in the gas meter device according to the first invention, to further include a pressure measuring unit which measures a pressure of the gas within the gas supply pipe, wherein the tamper determining unit determines that the gas is used without authorization in a case where, in addition to that the particular flow-rate change profile different from the appliance determining value registered in the registration storage unit is generated, the pressure of the gas measured by the pressure measuring unit reduces rapidly. According to this configuration, when the particular flow-rate change profile considered to be caused by the tamper of a user is generated, the gas pressure within the gas supply pipe is measured to thereby confirm whether or not the pressure reduces abruptly. Thus, since it is possible to totally determine whether or not the flow-rate change profile is generated due to the tamper of a user or occurs accidentally due to another reason, the tamper of the gas can be prevented more surely.

The fourth invention is configured, in particular, in the gas meter device according to the first invention, to further include a seismoscope which detects vibration of the gas meter device, wherein the tamper determining unit determines that the gas is used without authorization in a case where, in addition to that the particular flow-rate change profile different from the appliance determining value registered in the registration storage unit is generated, the seismoscope detects abnormal vibration. According to this configuration, when the particular flow-rate change profile considered to be caused by the tamper of a user is generated, it is confirmed whether or not the seismoscope detects abnormal vibration generated by an action such as the removal of the gas meter device. Thus, since it is possible to totally determine whether or not the flow-rate change profile is generated due to the tamper of a user or occurs accidentally due to another reason, the tamper of the gas can be prevented more surely.

The fifth invention is configured, in particular, in the gas meter device according to one of the first to fourth inventions, to further include a gas interruption valve which interrupts the gas when it is determined that the gas is used without authorization, wherein the tamper determining unit continues the gas interruption valve to interrupt the gas until the interruption is released by a management company or the like. According to this configuration, even if a user tries to conceal own unauthorized action by such an action of attaching the meter having been removed in advance to an original position so that the unauthorized action is not discovered by the inspection etc. of a management company, the gas can not be used in a normal state until the interruption state is notified to the management company or the like to thereby release the interruption state. Thus, since the unauthorized action can not be concealed, the tamper of the gas can be prevented more surely.

The sixth invention is configured, in particular, in the gas meter device according to one of the first to fourth inventions, to further include a display portion which displays, when it is determined that the gas is used without authorization, the tamper. According to this configuration, when it is determined that a user takes an unauthorized action, an alarm etc. as to the unauthorized action is displayed on the display portion and remained as the evidence of the unauthorized action. Thus, since the unauthorized action can not be concealed, the tamper of the gas can be prevented more surely.

The seventh invention is configured, in particular, in the gas meter device according to one of the first to fourth inventions, to further include a notifying unit which notifies, when it is determined that the gas is used without authorization, the tamper to a management company or the like in real time. According to this configuration, when it is determined that a user takes an unauthorized action, an alarm or the like as to the unauthorized action is notified to the management company or the like in real time. Thus, when a person in charge of the management company or the like is always in a stand-by state, a necessary action can be taken immediately. Accordingly, the tamper of the gas can be prevented more surely.

The eighth invention is configured, in particular, in the gas meter device according to one of the first to fourth inventions, to further include a tamper storage unit which stores, when it is determined that the gas is used without authorization, the tamper; and a notifying unit which notifies the stored content of the tamper storage unit to a management company or the like periodically at a predetermined timing. According to this configuration, after it is determined that a user takes an unauthorized action, the unauthorized action is notified to the management company or the like periodically at a predetermined timing. Thus, a person in charge of the management company or the like is merely required to stand by in synchronism with the timing, whereby a necessary action can be taken. Accordingly, the tamper of the gas can be prevented more surely.

The ninth invention is configured, in particular, in the gas meter device according to one of the first to fourth inventions, to further include a tamper storage unit which stores, when it is determined that the gas is used without authorization, the tamper; and a notifying unit which notifies the stored content of the tamper storage unit in accordance with an inquiry from a management company or the like. According to this configuration, after it is determined that a user takes an unauthorized action, the unauthorized action is notified in response to an inquiry from the management company or the like. Thus, according to the convenience of a person in charge of the management company or the like, a necessary action can be taken. Accordingly, the tamper of the gas can be prevented more surely.

The tenth invention is configured in a manner that, in particular, in the gas meter device according to one of the first to ninth inventions, the flow-rate measuring unit is an ultrasonic measuring type. According to this configuration, since the simultaneous measurement can be performed, the details of the flow-rate change according to the time lapse can be measured. Thus, when the generation of the particular flow-rate change profile different from the normal flow-rate change profile of a gas appliance is detected with a high accuracy, the tamper of the gas can be prevented more surely.

The eleventh invention is configured in a manner that, in particular, in the gas meter device according to one of the first to tenth inventions, a gas supply system using the gas meter device coupled to a gas supply pipe for homes is configured. According to this configuration, since the tamper of the gas can be prevented, the benefit to be originally obtained by the gas management company or the like. can be protected.

First Embodiment

FIG. 1 shows the configuration of a gas meter device according to an embodiment of the invention.

In FIG. 1, 1 depicts a gas meter device which is provided on the way of a gas supply pipe, and at least one gas appliance provided in each client home is coupled to a pipe on the downstream side of the gas meter device.

The gas meter device 1 includes a gas flow-rate measuring unit 2, a calculating unit 3 and an appliance information input unit 4 each for determining the gas appliance according to the invention, a registration storage unit 5 and an appliance determining unit 6 each for registering the information, a tamper determining unit 7 for determining whether or not gas is used without authorization, a gas type storage unit 8 for storing gas type supplied within the gas supply pipe, a gas type determining unit 9 for determining the gas type supplied within the gas supply pipe, a pressure measuring unit 10 for measuring the pressure within the gas supply pipe, a seismoscope 11 for detecting the vibration of the gas meter device, a gas interruption valve 12 for interrupting the gas when the gas is used without authorization, a display portion 13 for displaying the tamper when the gas is used without authorization, a notifying unit 14 for notifying the tamper to a management company or the like. when the gas is used without authorization, a tamper storage unit 15 for storing the tamper when the gas is used without authorization, a control circuit 16 for unifying and controlling the operations of the seismoscope 11 and the pressure measuring unit 11, processings such as the appliance determining processing and the tamper determining processing, and a battery (not shown) serving as a power source of the aforesaid constituent elements.

The registration storage unit 5 stores appliance determining values serving as comparison determining values for determining whether or not the flow rate has changed and safety reference values serving as comparison determining values for determining whether or not an abnormality has occurred. Although the invention uses a semiconductor memory as a storage unit for storing and holding recorded data, a magnetic recording medium or other unit may be used so long as data can be recorded additionally and rewritten. Further, data can be recorded in a plurality of recording mediums in a divided manner as the need arises.

Although a measuring unit of an ultrasonic type is used as to the gas flow-rate measuring unit 2 of the invention, another flow-rate measuring method such as the fluidic type can be used as the measuring method so long as the flow rate can be measured continuously at a constant cycle in a short time.

Hereinafter the operation will be explained.

First, the flow-rate measurement of the ultrasonic type will be explained based on FIG. 2. A measuring flow path 17 has a rectangular section. A pair of ultrasonic transmitter-receivers 18, 19 are attached on opposed wall surfaces disposed in orthogonal direction with respect to the gas flow direction of the measuring flow path 17 so as to sandwich the measuring flow path 17 therebetween in a manner that the ultrasonic transmitter-receivers are disposed on the upstream side and the downstream side of the flow path so that a straight line connecting these ultrasonic transmitter-receivers has a slanted angle φ with respect to the wall surface of the flow path. The ultrasonic transmitter-receivers 18, 19 alternately transmit and receive the ultrasonic to thereby measure with a constant time interval a difference of the transmission time of the ultrasonic between the forward direction transmission and the reverse direction transmission, respectively, and output the difference as a transmission time difference signal. A calculation unit (not shown) receives the transmission time difference signal and calculates a flow speed and a flow rate of a fluid to be measured.

A calculation expression will be shown below.

Figure 2:
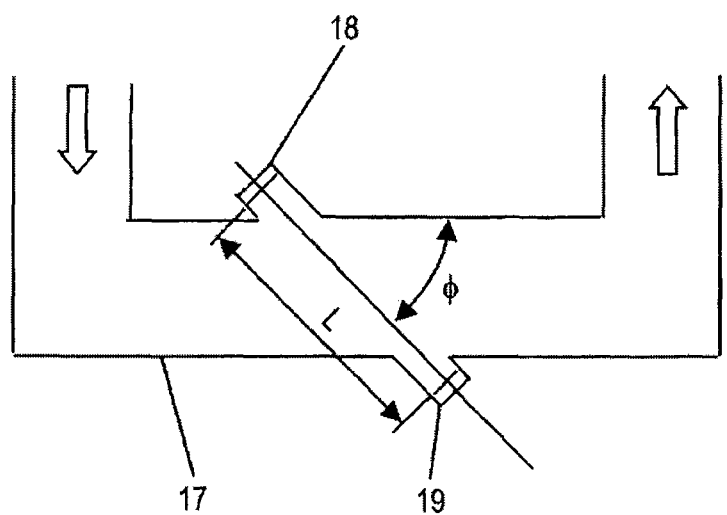
FIG. 2 is a diagram showing the configuration of a flow-rate measuring portion in the first embodiment of the invention.

L of FIG. 2 depicts a measuring distance, and supposing that t1 depicts a transmission time from the downstream side, t2 a transmission time from the upstream side and C the speed of sound, a flow speed V is expressed as follows.

$$V = (L/2 \cos \phi) \cdot ((1/t1) - (1/t2)) \quad \text{(Expression 1)}$$

The time interval of the measurement can be set in a range capable of transmitting and receiving the ultrasonic, and the invention performs the measurement with the time interval of 2 seconds. The time interval can be made shorter in view of the measurement principle. Since there is a gas appliance which starts in a time shorter than 2 seconds, it is advantageous to shorter the measurement time interval in order to simultaneously determine the appliance. However, there arises such a problem that the consumption rate of a battery becomes large when the measurement time interval is made shorter. Further, when the measuring time is set to be tens seconds which is almost same as the membrane type used in the conventional gas meter, it becomes difficult to view and determine the difference of the flow rate change according to the algorithm of the invention. Accordingly, according to the invention, the measurement is made with an interval of 2 seconds as a time balanced in view of the cost and the efficiency of determining the appliance.

Figure 3:
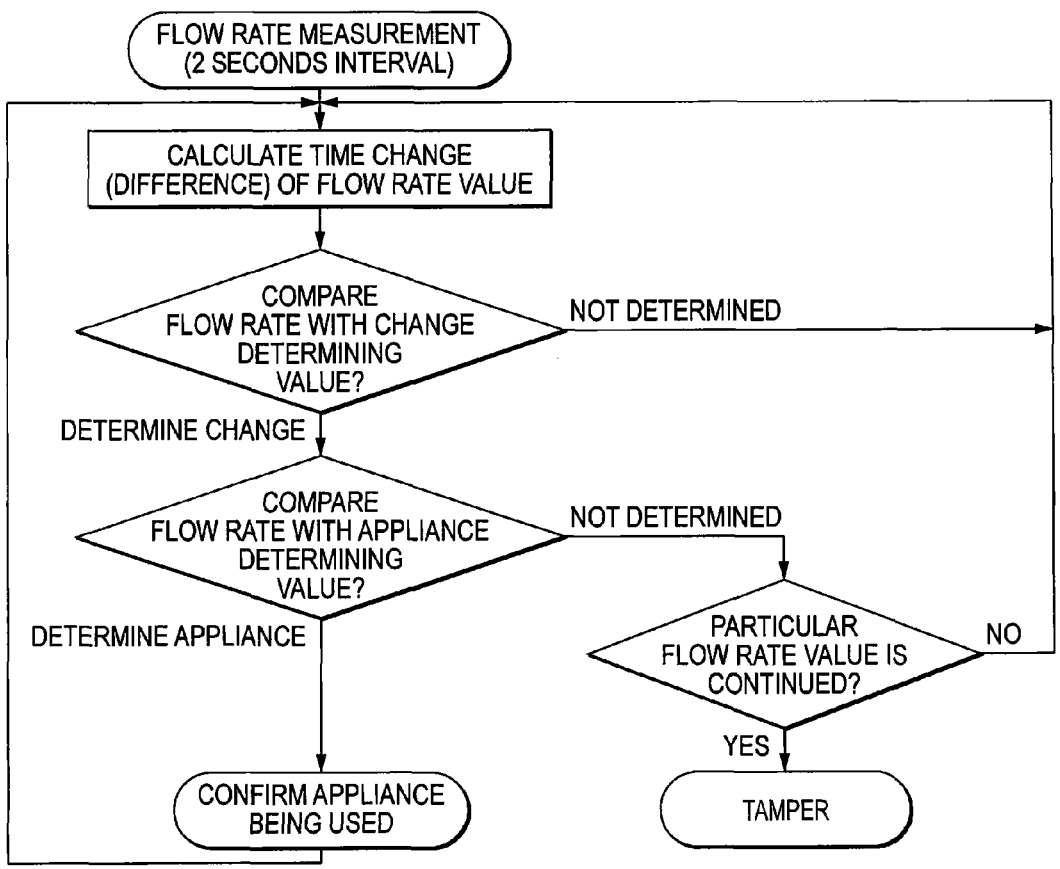
FIG. 3 is a flow chart of a determining operation in the first embodiment of the invention.

Next, the determining procedure of the operating state of the gas appliance will be explained with reference to FIG. 3.

As explained above, the gas meter device 1 is arranged in a manner that the gas flow rate is measured at every 2 seconds, then the measured data is sent to the calculating unit 3 and the calculating unit differentiates the flow rate values and outputs a difference data of the flow rate at every 2 seconds.

The difference data is sequentially sent to the appliance determining unit 6, which in turn compares the differential data with a change determining value registered in the registration storage unit 5. When the difference value exceeds the change determining value, it is determined that a state change occurs at the gas appliance. When the change is detected, the appliance determining unit 6 compares with the appliance determining values of individual states of each of the gas appliances registered in the registration storage unit 5 to thereby determine the appliance and the state of the appliance thus determined. As a result of the determination of the appliance, when it is determined that the appliance is not registered in the registration storage unit 5, the tamper determining unit 7 confirms whether or not there is a continuation of a particular flow rate. If there is a continuation of the particular flow rate, it is determined that a user without authorization uses the gas.

Figure 4:
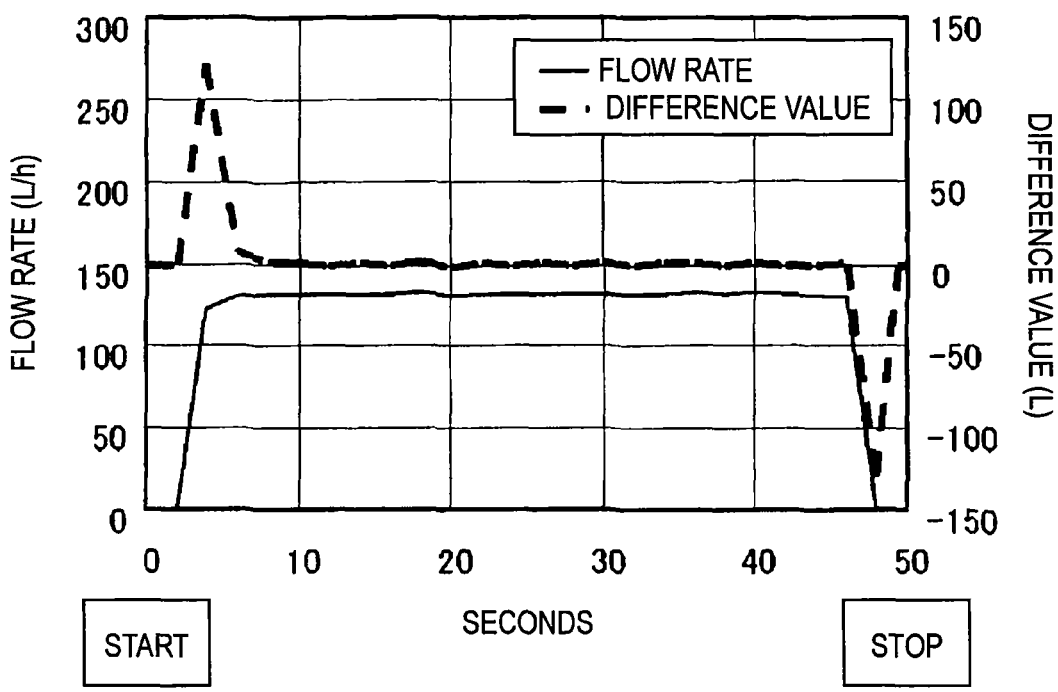
FIG. 4 is diagrams showing flow rates and calculation values in the first embodiment of the invention.
Figure 4:
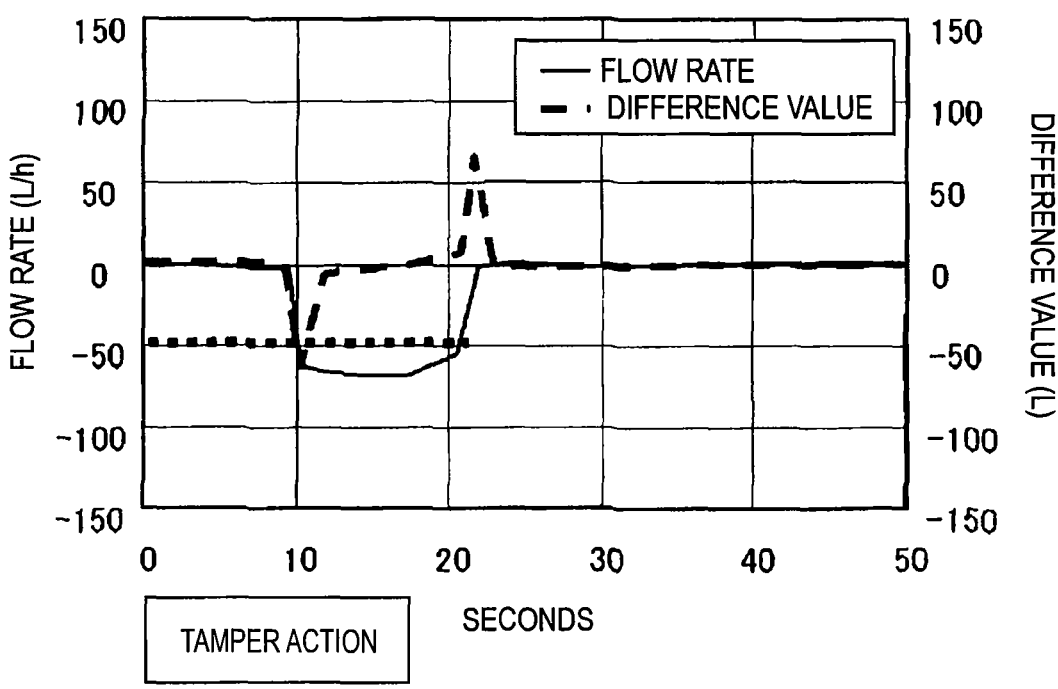

FIG. 4(a) shows the change of the gas flow rate and the change of the difference value at the time of actually using the gas appliance.

In the graph of FIG. 4(a), a steady line depicts the flow rate values of the gas measured by the flow-rate measuring unit and a broken line depicts the differential values thereof, that is, the difference values at every 2 seconds. At the time of starting the gas appliance, the difference value exhibits the peak value on the positive side, whilst the difference value exhibits the peak value on the negative side at the time of stopping the appliance.

Next, FIG. 4(b) shows an example of the change of the gas flow rate and the change of the difference value in the case where a user takes an unauthorized action such as the removal of the gas meter device.

In the graph of FIG. 4(b), a steady line depicts the flow rate values of the gas measured by the flow-rate measuring unit and a broken line depicts the differential values thereof, that is, the difference values at every 2 seconds. As an example where a user takes the unauthorized action such as the removal of the gas meter device, there is considered such a situation that the flow rate on the negative side which never occurs in the normal use of the gas appliance appears continuously. In such a case, supposing that the threshold value of the flow rate is −50 L/h and the threshold value of the continuous time is 10 seconds, when the flow rate on the negative side exceeding −50 L/h continues 10 seconds or more, it is determined that a user without authorization uses the gas.

In this manner, when a user takes the unauthorized action such as the removal of the gas meter device in order to without authorization use the gas, since the continuous generation of the particular flow rate value such as the flow rate on the negative side which never occurs in the normal use of the gas appliance is detected, the sign of the tamper of the gas can be detected, the tamper of the gas can be prevented.

Figure 5:
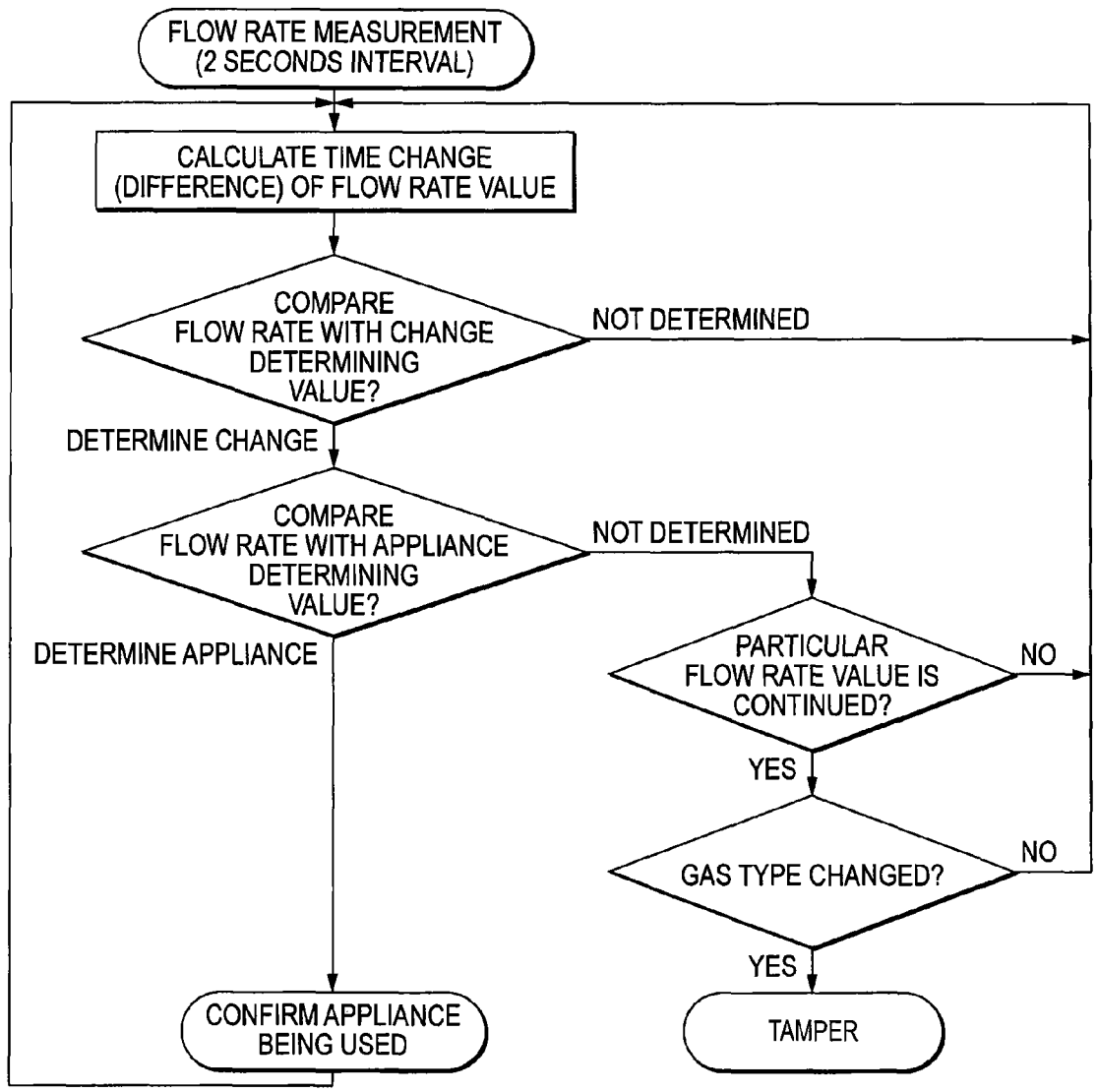
FIG. 5 is a flow chart of another determining operation in the first embodiment of the invention.

Further, as shown in FIG. 5, for example, the tamper determining unit 7 may be not only configured to detect the continuous generation of the particular flow rate value such as the flow rate on the negative side which never occurs in the normal use of the gas appliance but also configured to determine that the gas is used without authorization when the gas type determined by the gas type determining unit 9 differs from the gas type stored in the gas type storage unit 8 due to the mixing of the air etc. and so the gas type changes. According to this configuration, when a particular flow rate value considered to be caused by the tamper of a user appears continuously, the gas type is determined to thereby confirm whether or not the component of the gas has changed. Thus, since it is possible to totally determine whether or not the change of the gas type occurs due to the tamper of a user or occurs accidentally due to another reason, the tamper of the gas can be prevented more surely.

Further, in the ultrasonic measuring type, when it is utilized that the transmission time of the ultrasonic changes according to the gas type, since the transmission times of the ultrasonic in both the forward direction transmission and the reverse direction transmission between the ultrasonic transmitter-receivers 18, 19 simultaneously increases or reduces in the case where the gas component changes due the mixture of the air etc., the change of the gas type can be detected easily. Thus, it is possible to constitute both the gas flow-rate measuring unit 2 and the gas type determining unit 9 as a single unit without providing them independently.

Figure 6:
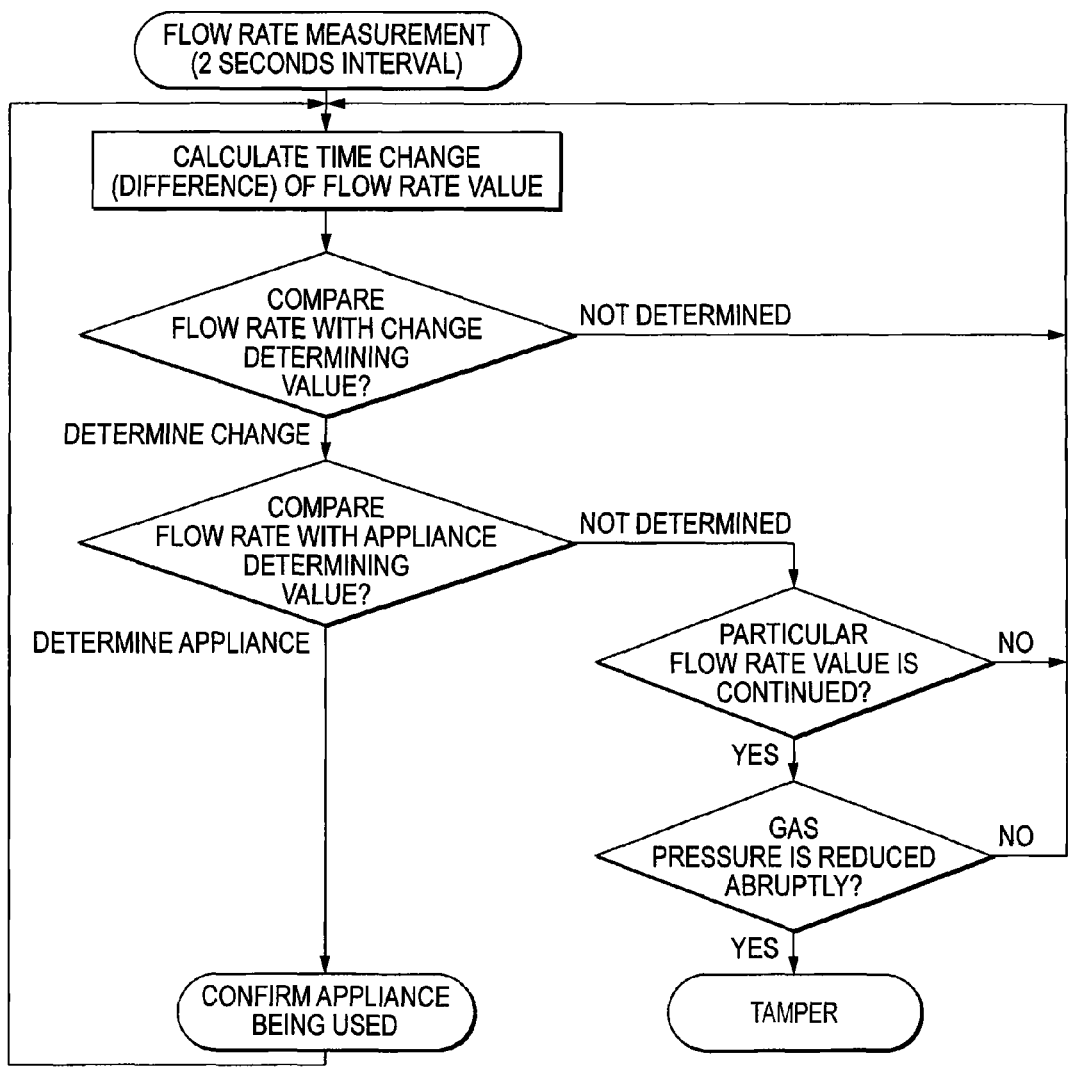
FIG. 6 is a flow chart of still another determining operation in the first embodiment of the invention.

Further, as shown in FIG. 6, for example, the tamper determining unit 7 may be not only configured to detect the continuous generation of the particular flow rate value such as the flow rate on the negative side which never occurs in the normal use of the gas appliance but also configured to determine that the gas is used without authorization when the gas pressure measured by the pressure measuring unit 10 reduces abruptly. According to this configuration, when a particular flow rate value considered to be caused by the tamper of a user appears continuously, the gas pressure within the gas supply pipe is measured to thereby confirm whether or not the pressure reduces abruptly. Thus, since it is possible to totally determine whether or not the abrupt reduction of the gas pressure occurs due to the tamper of a user or occurs accidentally due to another reason, the tamper of the gas can be prevented more surely.

Figure 7:
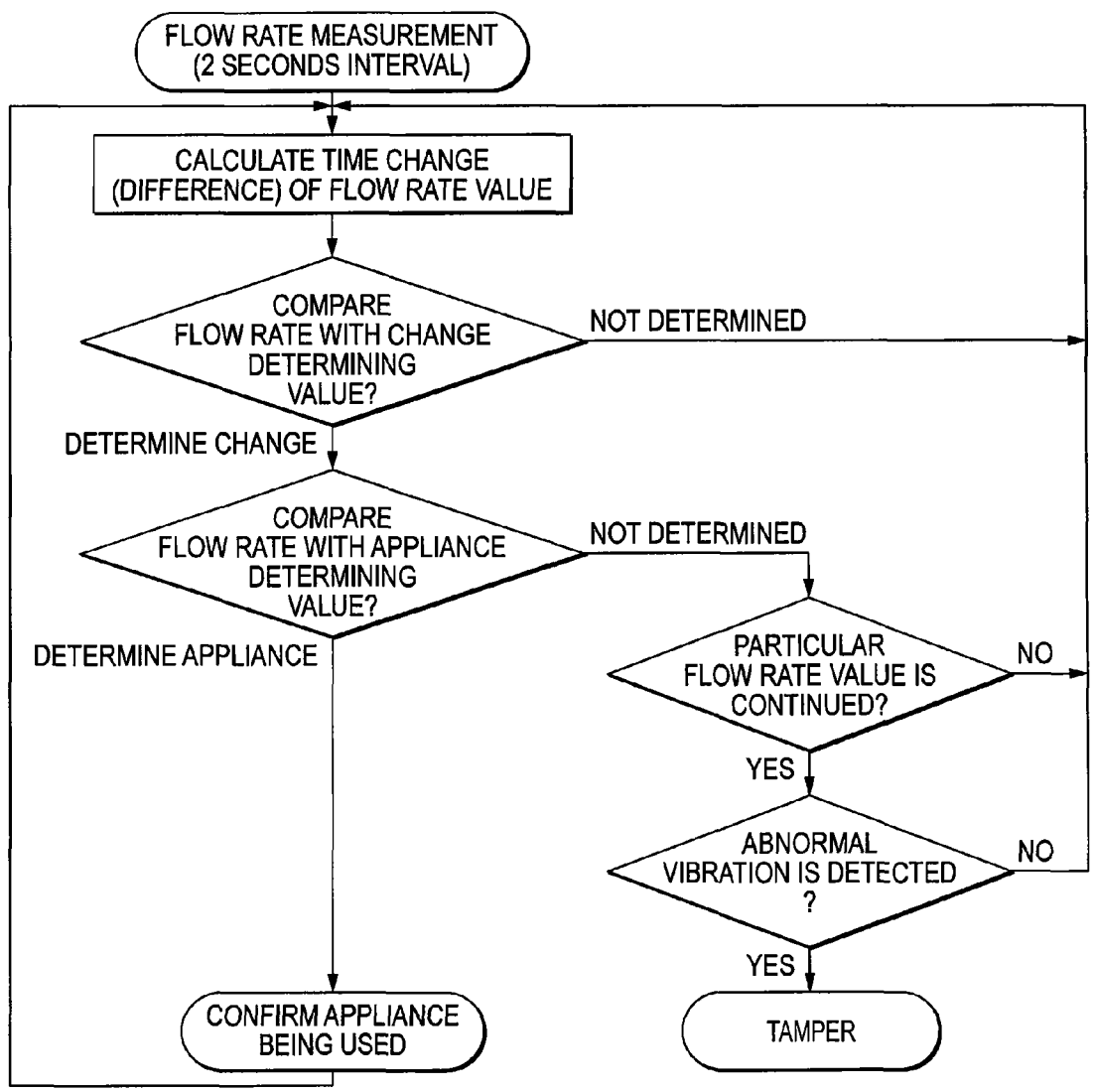
FIG. 7 is a flow chart of still another determining operation in the first embodiment of the invention.

Further, as shown in FIG. 7, for example, the tamper determining unit 7 may be not only configured to detect the continuous generation of the particular flow rate value such as the flow rate on the negative side which never occurs in the normal use of the gas appliance but also configured to determine that the gas is used without authorization when the seismoscope 11 detects abnormal vibration. According to this configuration, when a particular flow rate value considered to be caused by the tamper of a user appears continuously, it is confirmed whether or not the seismoscope 11 detects abnormal vibration generated by an action such as the removal of the gas meter device. Thus, since it is possible to totally determine whether or not the abnormal vibration occurs due to the tamper of a user or occurs accidentally due to another reason, the tamper of the gas can be prevented more surely.

The seismoscope 11 may be configured to also have a function of detecting the vibration such as an earthquake as well as the function of detecting the abnormal vibration generated by an action such as the removal of the gas meter device.

Figure 8:
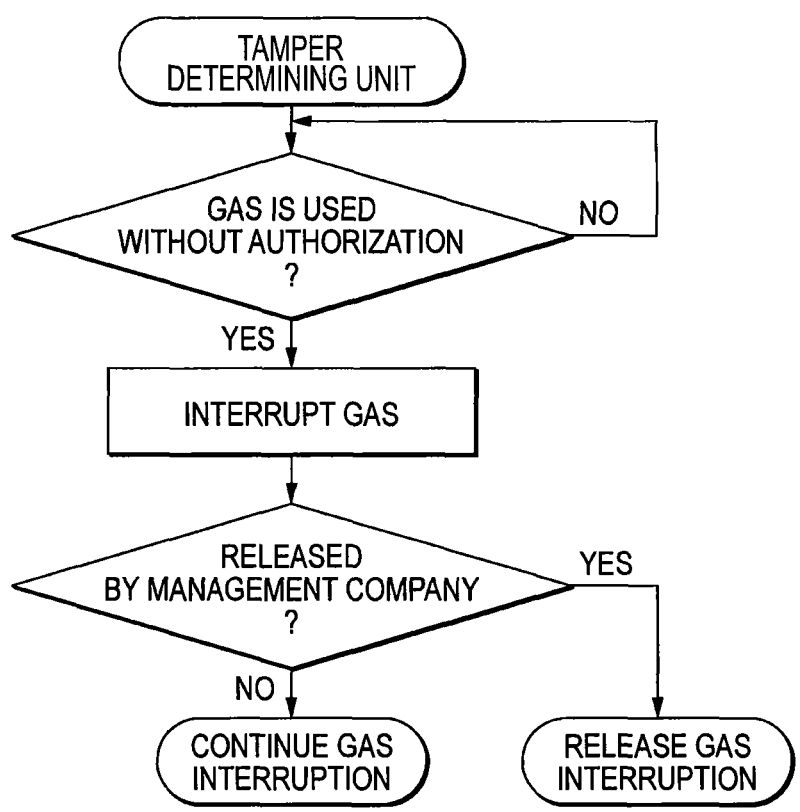
FIG. 8 is a flow chart of still another determining operation in the first embodiment of the invention.

Further, as shown in FIG. 8, for example, the tamper determining unit 7 may be configured in a manner that when it is determined that the gas is used without authorization, the gas is interrupted by the gas interruption valve 12 and the gas interruption by the gas interruption valve 12 is continued until the interruption is released by a management company or the like. According to this configuration, even if a user tries to conceal own unauthorized action by such an action of attaching the meter having been removed in advance to an original position so that the unauthorized action is not discovered by the inspection or the like of a management company, the gas can not be used in a normal state until the interruption state is notified to the management company or the like to thereby release the interruption state. Thus, since the unauthorized action can not be concealed, the tamper of the gas can be prevented more surely.

Figure 9:
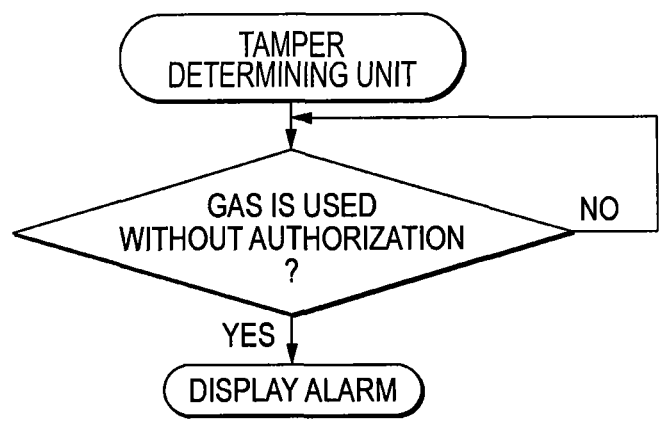
FIG. 9 is a flow chart of still another determining operation in the first embodiment of the invention.

Further, as shown in FIG. 9, for example, the tamper determining unit 7 may be configured in a manner that when it is determined that the gas is used without authorization, the tamper is displayed on the display portion 13. According to this configuration, when it is determined that a user takes an unauthorized action, an alarm or the like as to the unauthorized action is displayed on the display portion 13 and remained as the evidence of the unauthorized action. Thus, since the unauthorized action can not be concealed, the tamper of the gas can be prevented more surely.

The display portion 13 may be configured to also have a function of displaying a flow rate of the used gas or the like as well as the function of displaying the alarm or the like as to the unauthorized action.

Figure 10:
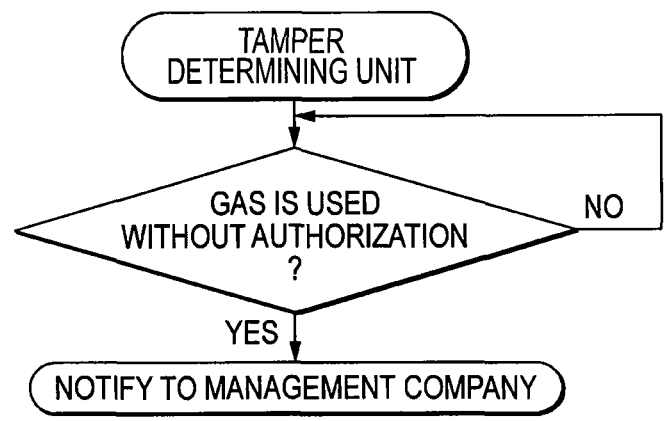
FIG. 10 is a flow chart of still another determining operation in the first embodiment of the invention.

Further, as shown in FIG. 10, for example, the tamper determining unit 7 may be configured in a manner that when it is determined that the gas is used without authorization, the tamper is notified to the management company or the like in real time from the notifying unit 14. According to this configuration, when it is determined that a user takes an unauthorized action, an alarm or the like as to the unauthorized action is notified to the management company or the like in real time. Thus, when a person in charge of the management company or the like is always in a stand-by state, a necessary action according to a situation can be taken immediately such as the stop of the gas supply to a user's home or the visit to and inspection for the user's home or the confirmation of and communication with the user. Accordingly, the tamper of the gas can be prevented more surely.

Figure 11:
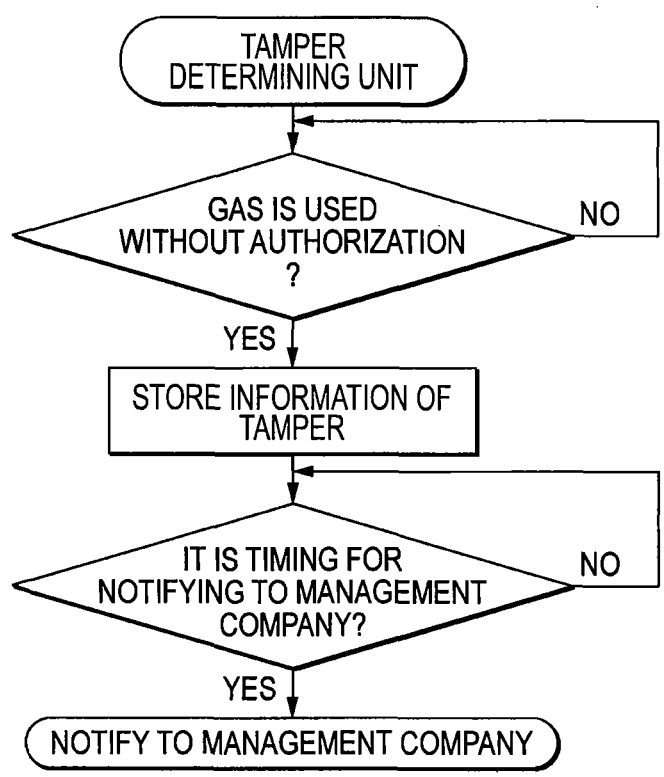
FIG. 11 is a flow chart of still another determining operation in the first embodiment of the invention.

Further, as shown in FIG. 11, for example, the tamper determining unit 7 may be configured in a manner that when it is determined that the gas is used without authorization, the tamper is stored in the tamper storage unit 15 and the stored contents of the tamper storage unit 15 is notified to the management company or the like periodically at a predetermined timing from the notifying unit 14. According to this configuration, after it is determined that a user takes an unauthorized action, the unauthorized action is notified to the management company or the like periodically at a predetermined timing. Thus, a person in charge of the management company or the like is merely required to stand by in synchronism with the timing, whereby a necessary action according to a situation can be taken such as the stop of the gas supply to a user's home or the visit to and inspection for the user's home or the confirmation of and communication with the user. Accordingly, the tamper of the gas can be prevented more surely.

Figure 12:
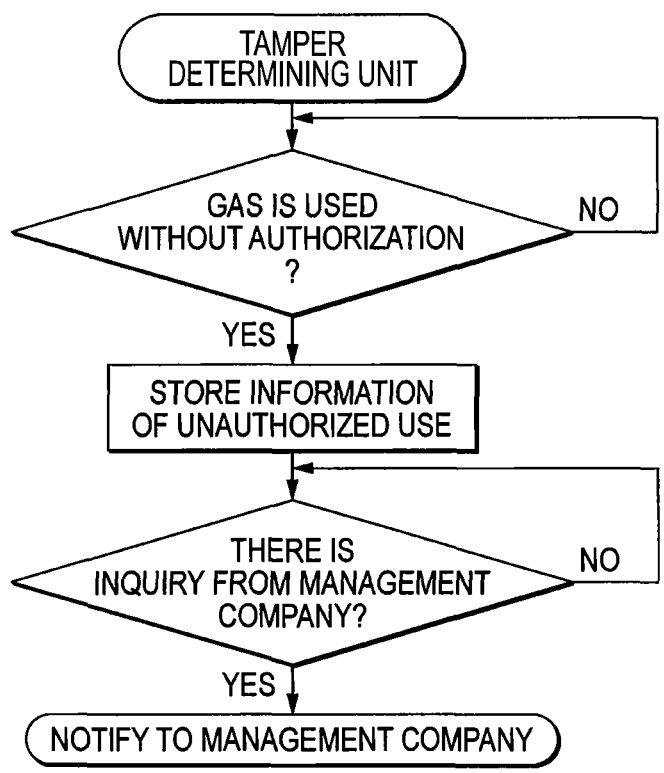
FIG. 12 is a flow chart of still another determining operation in the first embodiment of the invention.
Figure 13:
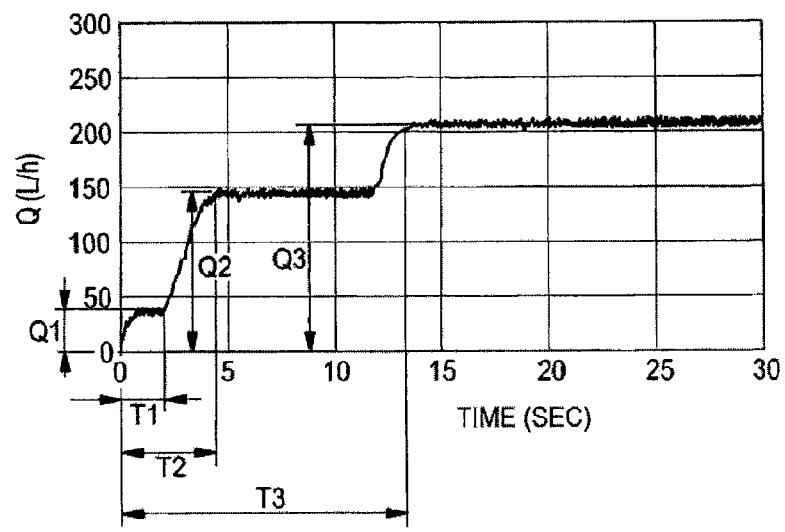
FIG. 13 is a data diagram showing the determining method of a flow-rate measuring apparatus of the related art.

Further, as shown in FIG. 12, for example, the tamper determining unit 7 may be configured in a manner that when it is determined that the gas is used without authorization, the tamper is stored in the tamper storage unit 15 and the stored contents of the tamper storage unit 15 is notified from the notifying unit 14 in response to an inquiry from the management company or the like. According to this configuration, after it is determined that a user takes an unauthorized action, the unauthorized action is notified in response to an inquiry from the management company or the like. Thus, according to the convenience of a person in charge of the management company or the like, a necessary action according to a situation can be taken such as the stop of the gas supply to a user's home or the visit to and inspection for the user's home or the confirmation of and communication with the user. Accordingly, the tamper of the gas can be prevented more surely.

Further, the invention includes a gas supply system containing a gas supply source using the gas meter device according to the invention thus configured.

Although the explanation is made as to the case where the ultrasonic flow meter is used, it will be apparent that the similar effects can be obtained in the case of using a flow-rate measuring unit of another instantaneous type.

The invention is based on Japanese Patent Application No. 2007-318159 filed on Dec. 10, 2007, the contents of which is incorporated herein by reference.

Although the various embodiments of the invention are explained above, the invention is not limited to these embodiments, and it is intended that those skilled in the art can change and modify the embodiments based on the description of the specification and the well known technique and such the changes and modifications are contained in a scope claimed to be protected.

INDUSTRIAL APPLICABILITY

As described above, the gas meter device according to the invention is configured to include the flow-rate measuring unit which is coupled to the gas supply pipe for homes and measures a gas flow rate; the appliance information input unit; the registration storage unit which stores data registered by the appliance information input unit; the appliance determining unit which compares the appliance determining value registered in the registration storage unit with a gas flow-rate value measured by the flow-rate measuring unit to thereby determine a gas appliance being used; and an tamper determining unit which determines that gas is used without authorization when the particular flow-rate change profile different from the appliance determining value registered in the registration storage unit is generated due to an unauthorized action of a user or the like. Thus, even if a user takes an unauthorized action such as the removal of a gas meter device in order to use gas without authorization, since the generation of a particular flow-rate change profile different from a normal flow-rate change profile of a gas appliance is detected, the sign of the tamper of the gas can be detected, whereby the tamper of the gas can be prevented.

The invention claimed is:

1. A gas meter device, comprising:
a flow-rate measuring unit which is coupled to a gas supply pipe for homes and measures a gas flow rate;
an appliance information input unit;
a registration storage unit which stores data registered by the appliance information input unit;
an appliance determining unit which compares appliance determining values registered in the registration storage unit with a gas flow-rate value measured by the flow-rate measuring unit to thereby determine a gas appliance being used; and
a tamper determining unit configured to:
  determine whether a particular flow-rate change profile generated by a change in flow rate is different from the appliance determining values registered in the registration storage unit;
  based on a determination that the particular flow-rate change profile is different from the appliance determining values, determine whether there is a continuation of a given flow rate in the gas flow-rate value measured by the flow-rate measuring unit over a predetermined time period; and
  based on a determination that there is a continuation of the given flow rate in the gas flow-rate value measured by the flow-rate measuring unit over the predetermined time period, determine the gas used corresponding to the particular flow-rate change profile is used without authorization.

2. A gas meter device according to claim 1, further comprising:
a pressure measuring unit which measures a pressure of the gas within the gas supply pipe, wherein
the tamper determining unit determines that the gas is used without authorization in a case where, in addition to that the particular flow-rate change profile generated by a change in flow rate is different from the appliance determining value, the pressure of the gas measured by the pressure measuring unit reduces rapidly.

3. A gas meter device according to claim 1, further comprising:
a seismoscope which detects vibration of the gas meter device, wherein
the tamper determining unit determines that the gas is used without authorization in a case where, in addition to that the particular flow-rate change profile generated by a change in flow rate is different from the appliance determining value, the seismoscope detects abnormal vibration.

4. A gas meter device according to claim 1, further comprising:
a gas interruption valve which interrupts the gas when it is determined that the gas is used without authorization, wherein
the tamper determining unit continues the gas interruption valve to interrupt the gas until the interruption is released by a management company.

5. A gas meter device according to claim 1, further comprising:
a display portion which displays, when it is determined that the gas is used without authorization, the tamper.

6. A gas meter device according to claim 1, further comprising:
a notifying unit which notifies, when it is determined that the gas is used without authorization, the tamper to a management company in real time.

7. A gas meter device according to claim 1, further comprising:
a tamper storage unit which stores, when it is determined that the gas is used without authorization, the tamper; and
a notifying unit which notifies a stored content of the tamper storage unit to a management company periodically at a predetermined timing.

8. A gas meter device according to claim 1, further comprising:
a tamper storage unit which stores, when it is determined that the gas is used without authorization, the tamper; and
a notifying unit which notifies a stored content of the tamper storage unit in accordance with an inquiry from a management company.

9. A gas meter device according to claim 1, wherein the flow-rate measuring unit is an ultrasonic measuring type.

10. A gas supply system using the gas meter device according to claim 1.

11. A gas meter device according to claim 1, wherein the given flow rate indicates an arbitrary flow rate outside a particular threshold range.

12. A gas meter device according to claim 1, wherein the given flow rate indicates a particular flow rate below a threshold value.

13. A gas meter device comprising:
a flow-rate measuring unit which is coupled to a gas supply pipe for homes and measures a gas flow rate;
an appliance information input unit;
a registration storage unit which stores data registered by the appliance information input unit;
an appliance determining unit which compares appliance determining values registered in the registration storage unit with a gas flow-rate value measured by the flow-rate measuring unit to thereby determine a gas appliance being used;
a gas type storage unit which stores gas type supplied into the gas supply pipe at a time of normal use;
a gas type determining unit which determines gas type being supplied at present;
a tamper determining unit which determines that the gas is used without authorization when:
a particular flow-rate change profile generated by a change in flow rate is different from the appliance determining values registered in the registration storage unit, and
the gas type determined by the gas type determining unit differs from the gas type stored in the gas type storage unit.

14. A gas meter device according to claim 13, further comprising:
a gas interruption valve which interrupts the gas when it is determined that the gas is used without authorization, wherein
the tamper determining unit continues the gas interruption valve to interrupt the gas until the interruption is released by a management company.

15. A gas meter device according to claim 13, further comprising:
a display portion which displays, when it is determined that the gas is used without authorization, the tamper.

16. A gas meter device according to claim 13, further comprising:
a notifying unit which notifies, when it is determined that the gas is used without authorization, the tamper to a management company in real time.

17. A gas meter device according to claim 13, further comprising:
a tamper storage unit which stores, when it is determined that the gas is used without authorization, the tamper; and
a notifying unit which notifies a stored content of the tamper storage unit to a management company periodically at a predetermined timing.

18. A gas meter device according to claim 13, further comprising:
a tamper storage unit which stores, when it is determined that the gas is used without authorization, the tamper; and
a notifying unit which notifies a stored content of the tamper storage unit in accordance with an inquiry from a management company.

19. A gas meter device according to claim 13, wherein the flow-rate measuring unit is an ultrasonic measuring type.

20. A gas supply system using the gas meter device according to claim 13.

* * * * *